Figure 1:
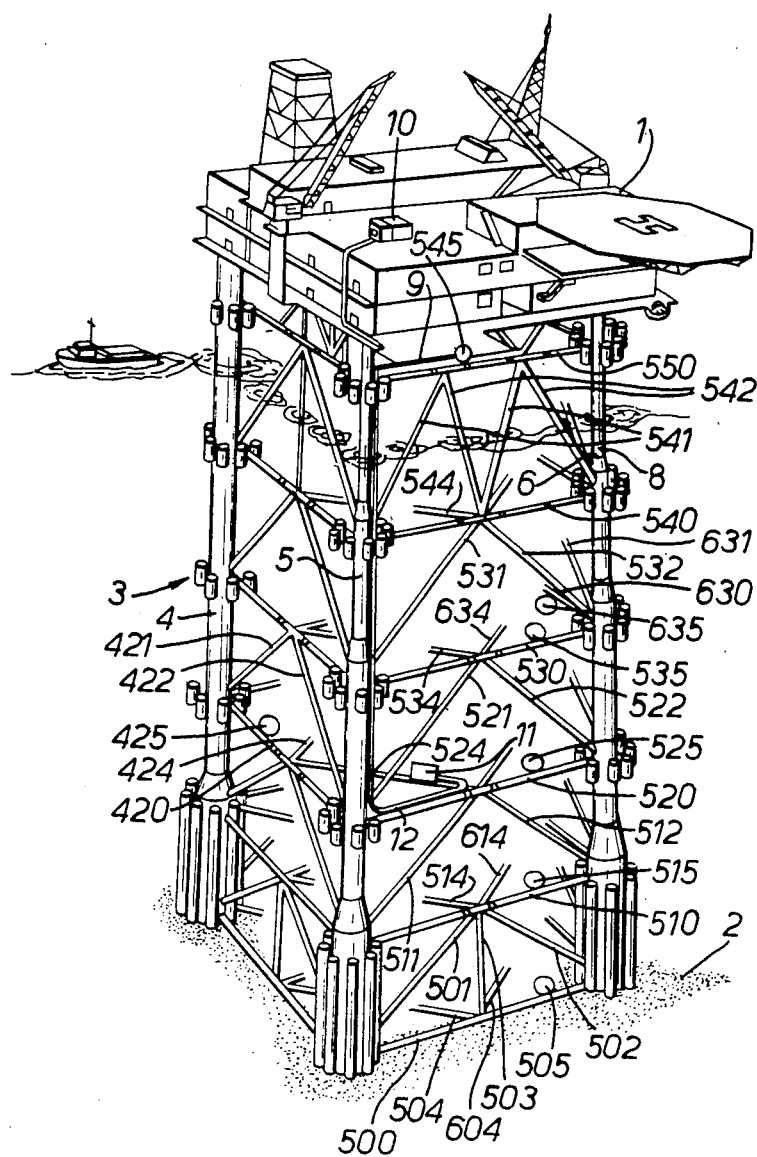

United States Patent [19]
Crohas et al.

[11] Patent Number: 4,721,413
[45] Date of Patent: Jan. 26, 1988

[54] MARINE PLATFORMS

[75] Inventors: Henri Crohas, Meudon; Rene Blondy, Ris Orangis, both of France

[73] Assignee: Compagnie Francaise des Petroles, Paris, France

[21] Appl. No.: 311,230

[22] Filed: Oct. 14, 1981

[30] Foreign Application Priority Data

Dec. 4, 1980 [FR] France ............................ 80 25736

[51] Int. Cl.$^4$ .................. E02D 21/00; G01M 3/08
[52] U.S. Cl. .................................. 405/211; 405/195; 73/40.5 A
[58] Field of Search ............... 405/195, 204, 208, 211, 405/216; 73/40, 40.5 R, 40.5 A; 138/104; 340/48, 544, 605, 690; 285/93

[56] References Cited

U.S. PATENT DOCUMENTS

| | | | |
|---|---|---|---|
| 4,021,773 | 5/1977 | Keenan | 73/40.5 A |
| 4,043,180 | 8/1977 | Morris et al. | 73/40.5 A |
| 4,104,906 | 8/1978 | Oertle | 73/40 X |
| 4,116,044 | 9/1978 | Garrett | 285/93 X |
| 4,143,540 | 3/1979 | Peterson et al. | 405/195 X |
| 4,289,019 | 9/1981 | Claytor | 73/40.5 A |

Primary Examiner—Nancy J. Stodola
Attorney, Agent, or Firm—Sughrue, Mion, Zinn, Macpeak and Seas

[57] ABSTRACT

A marine platform comprising a structure composed of a lattice of tubular elements sealingly connected to one another, includes a crack detection system comprising pickups provided on at least some of the elements and adapted to detect the passage of fluid through a wall, each pickup including an autonomous energy source and an acoustic signal transmission means. A signal acquisition unit adapted to receive signals from the pickups is disposed on a non-submerged part of the platform.

6 Claims, 3 Drawing Figures

MARINE PLATFORMS

The present invention relates to a fixed or floating marine platform whose structure consists of a lattice of tubular elements sealingly joined to one another, particularly by welding.

A very important problem for the security of installations at sea is that of detecting cracks which may form in these elements or in their connections.

A periodic visual inspection may be made, after cleaning of zones, such as welded areas, which are most subject to the risk of giving rise to the formation of cracks. This, however, entails a very lengthy and expensive operation which can be repeated only at long intervals of time.

It has been proposed to provide cavities subjected to a vacuum in the welded areas, in such a manner that these cavities lose their level of vacuum if an adjacent crack develops. However, apart from the fact that in certain constructions these cavities themselves dangerously reduce the mechanical strength of the zone under observation, it is only possible in this way to observe very limited areas, and there is thus no protection against neighbouring cracks which escape detection.

One object of the present invention is to provide effective monitoring of all the endangered zones of a platform structure by means which can be simple to achieve.

Studies and tests carried out with this end in view have made it possible to ascertain that it was not necessary to detect a crack as soon as it starts to form, but that it was sufficient to do so once this crack passes through the thickness of the wall of a tubular element.

According to the invention there is provided a marine platform comprising a structure composed of a lattice of tubular elements sealingly connected to one another, pickups provided on at least some of said tubular elements, said pickups being adapted to detect the passage of a fluid through a wall and comprising autonomous energy source means and acoustics signal transmissions means, and a signal acquisition unit adapted to receive signals from said signal transmission means of said pickups and disposed on a non-submerged part of said platform.

By "autonomous energy source" is understood a source able to function for several years, for example some ten years, without external replenishment.

The passage of fluid is not necessarily detected instantaneously. It is sufficient for the pickup to measure a parameter progressively modified by such passage of fluid and evolving sufficiently rapidly for detection to take place before the crack becomes dangerous.

The pickup may be a pressure gauge measuring the pressure inside a tubular element. In the normal state, the interior of the tubular element may be left at atmospheric pressure or be subjected to a vacuum, but it is preferred to subject it to a pressure higher than the external hydrostatic pressure at the place of use, so that the passage of fluid caused by a possible crack will be the passage of gas, generally air, from the inside to the outside of a tubular element; a gas will in fact pass more easily than water through a crack, and the direction of the passage, from inside to outside, eliminates the risk of the clogging of the crack by marine or other outside dirt. The pressure gauge then detects a drop in pressure if a crack occurs. If in the normal state the interior of the tubular element is at a pressure lower than the hydrostatic pressure, instead of a pressure gauge detecting an increase in pressure the pickup used may be a hygrometer detecting the entrance of humidity into the tubular element.

The pickups may be arranged to transmit acoustic signals only in the event of the detection of the passage of fluid through a tubular element wall. For greater security it is preferred either to interrogate, the pickups periodically from the surface or to arrange for the automatic transmission by the pickups, at predetermined intervals of time, of a signal giving information on a parameter (for example pressure or humidity) sensitive to the passage of a fluid through a tubular element wall. This information may be a measurement or more simply an indication that a measured parameter is below or above a certain threshold. The acoustic signals are transmitted either through the material, generally steel, constituting the platform structure, or through the water in the case of constantly submerged pickups, a submerged intermediate transmission means adapted to receive the acoustic signals transmitted by the pickups through the water being then connected by cable to the signal acquisition unit. A hybrid solution may be adopted, which comprises autonomous pickups in the permanently submerged zone and wired pickups in the tidal zone (that is to say the zone sometimes in the air and sometimes in the water) or in the zone which is out of the water—this last zone including, among others, the platform deck structures.

Figure 2:
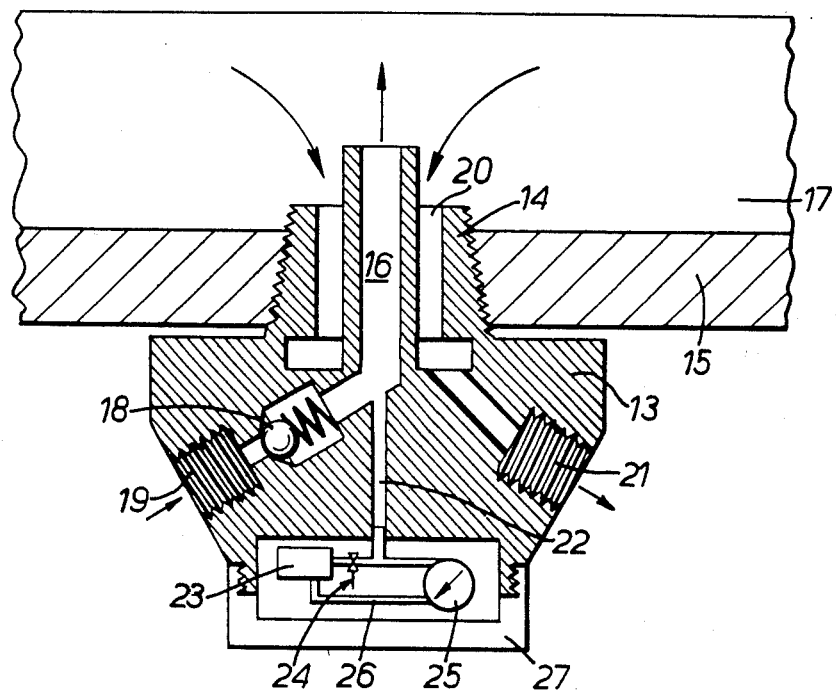
Figure 3:
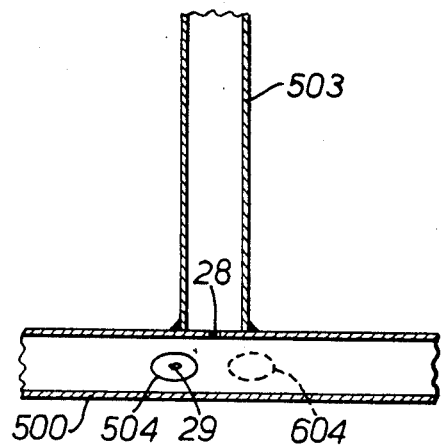

Other features of the invention will become clear from the following description of an embodiment, given by way of example only, with reference to the accompanying drawings, in which:

FIG. 1 shows in perspective a complete platform equipped with a crack detection system according to the invention, FIG. 2 shows in section and on a large scale a pickup mounted on a tubular element, and FIG. 3 is a view in section of a junction node of tubular elements.

FIG. 1 shows a marine platform 1 supported on a sea bed 2 by a structure 3 of tubular elements welded sealingly to one another. These tubular elements are composed of four upwardly directed legs, of which three 4, 5, 6 are visible in the figure, and of an assembly of connecting members which extend on the one hand in the faces formed between the successive legs and on the other hand from one face to another in horizontal planes, where they form reactangles (they are then referred to as horizontal struts). The connecting members situated in a face comprise horizontal chord members and inclined struts. The connecting members will be given references comprising a three-digit number in which the first digit is the reference numeral 4, 5, 6 (the leg which should bear the reference 7 not being shown in the drawings) of the leg viewed by an observer standing inside the structure 3, facing the member in question when the latter is a horizontal strut or on the right of the face to which the member belongs if the member is an element of a face, the second digit corresponds to the level 0, 1, 2, 3, 4, 5 of the horizontal member—the horizontal chord member or horizontal strut in question—or of the chord member above which the inclined strut in question rises, while the third digit is 0 in the case of a chord member, 1 or 2 in the case of a strut inclined in one direction or the other, 3 in the case of a vertical strut, and 4 in the case of a horizontal strut.

One pickup could be disposed on each tubular element, but it appears preferable to group together a plurality of tubular elements to form a common interior space monitored by one and the same pickup.

On the face to which the reference of the leg 5 is given, provision has here been made to distribute the tubular elements in the following manner:

Group of elements 500 - 501 - 502 - 503 - 504 with a pickup 505;
Group of elements 510 - 511 - 512 - 514 with a pickup 515;
Group of elements 520 - 521 - 522 - 524 with a pickup 525;
Group of elements 530 - 531 - 532 - 534 with a pickup 535;
Group of elements 540 - 541 - 542 - 550 with a pickup 545.

The other faces may have similar groupings. For example, on the face to which the reference of the leg 4 is given there will be groups such as the group of elements 420 - 421 - 422 - 424 with a pickup 425, and on the face to which the reference of the leg 6 is given there will be groups such as the group of elements 630 - 631 - 632 (not visible) - 634 with a pickup 635.

This grouping obviously only constitutes an example among many other possibilities.

The level of the sea has been shown at 8. The pickup 545 is generally out of the water and has been connected by a cable 9 to an acquisition unit 10 disposed on the platform. The pickups 505, 515, 525, and 535 are continuously submerged and they are adapted to transmit an acoustic signal which passes through the water to a submerged intermediate transmission means 11, which converts the acoustic signals received into electric signals and which is connected by a cable 12 to the acquisition unit 10.

The pickups are here manometric pickups monitoring the maintenance of the air pressure which was initially established inside the tubular elements. If the platform structure rests on a bed at a depth of 90 metres, the hydrostatic pressure outside the tubular elements is at a maximum of about 10 bars, and it will for example be possible to fill the tubular elements with compressed air at 20 bars.

In order to avoid the influence of temperature, the pickups may be provided with a temperature variation compensation system modifying the pressure value measured as a function of temperature. It is also possible to measure a pressure difference between the pressure inside a tubular element and the pressure in an auxiliary chamber incorporated in the pickup and initially set at the same pressure as the tubular element.

FIG. 2 shows a pickup which is intended to be placed on a tubular element of an existing platform structure; this pickup comprises a body 13 provided with a plug 14 screwed into the wall 15 of a tubular element. In the body 13 a duct 16 is provided, which is in communication with the space 17 inside the tubular element and which is connected to the outside by a valve 18 and a connector 19 permitting the introduction of compressed air. Another duct 20 inside the body 13, in communication with the space 17 and connected to the outside by a connector 21, makes it possible to drain off the water which enters the tubular element during the fitting of the pickup. The connector 21 is closed by a plug (not shown) after the draining operation. In a new platform the pickups are preferably installed before immersion and no draining by way of the members 20 and 21 is required.

The duct 16 is connected by a small duct 22 both to an auxiliary chamber 23, via a cock 24, and to a pressure gauge 25, the latter also being connected directly to the chamber 23 by a duct 26. When pressure is established in the space 17, the cock 24 is opened and the same pressure is established in the chamber 23 as in the space 17. The cock 24 is then closed; the chamber 23 is thus isolated from the duct 22 and the pressure gauge 25 is subjected to the pressure difference existing between the space 17 and the auxiliary chamber 23, this difference remaining zero as long as there is no escape of air from the wall 15 of the tubular element.

The pressure gauge 25 has been shown as if it were a direct reading instrument simply protected by a removable cover 27, but in reality it is an apparatus transmitting acoustic signals and provided with its own energy source, such as an electric accumulator or a lithium battery, for example, the differential pressure triggering off an acoustic signal, for example by means of a conventional piezo-electric system. The pickups 505, 515, 525, 535, 425, 635 are of the last-mentioned type. In the pickup 545 the pressure gauge 25 is replaced by an apparatus transmitting electric signals. The pickups may be not only transmitters but also receivers and may be interrogated by the acquisition unit 10. The coding of acoustic transmitter and receiver pickups, particularly in accordance with the acoustic frequency, makes it possible to address the messages transmitted by the acquisition unit 10 and retransmitted by the intermediate member 11, and to identify by its address the position of the pickup which has transmitted a signal.

A message in acoustic form is transmitted by each submerged pickup at predetermined intervals of time, for example every week. In addition to clock synchronisation and format signals, this message contains an address signal, a differential pressure measurement signal, and an alarm signal.

Information redundancy is preferably provided, two pressure pickups being mounted on the same tubular element or group of tubular elements to be monitored, both of them having a threshold comparator connected to one and the same apparatus triggering off an alarm transmission. This apparatus also advantageously acts on the length of the intervals of time between two successive transmissions of acoustic signals made by this group of two pickups, in order then to bring about a much faster transmission rhythm.

The message transmitted by the pickups is preferably in the form of acoustic signals coded in binary language by means of two frequencies defining the two possible states of a bit.

The risk of confusion due to the possible multi-paths of the acoustic waves is avoided by leaving between the end of a preceding bit and the beginning of the following bit a sufficient interval of time for the damping of all the waves which, because of the transmission of this preceding bit, could act on the signal acquisition unit 10 through multipaths or reflections. For example, one bit is transmitted every second for one-tenth of a second. It has been found that it was preferable to select the acoustic frequencies in the range from 40 to 80 KHz.

In the case of an existing installation, one pickup will generally be placed on each tubular element, although it is also possible to connect the interiors of a plurality of tubular elements by a small duct and thus reduce the number of pickups used.

In the case of a new installation, it will be preferable to connect together the interiors of a plurality of tubular elements, as provided in the embodiment shown in FIG. 1.

FIG. 3 shows how, during the construction of the platform structure, it is possible to establish communications between a plurality of tubular elements. The node where the chord member 500, the vertical strut 503, and the horizontal struts 504 and 604 meet has been selected as an example. The interior of the member 604 is not in communication with the interior of the chord member 500. On the other hand, a hole 28 has been made in the portion of the wall of the chord member 500 which is surrounded by the junction of the strut 503 with the chord member 500, and a hole 29 has been made in the portion of the wall of the chord member 500 which is surrounded by the junction of the member 504 with the chord member 500. Communications of these kinds can be made at all the nodes where it is desired to do so, irrespective of the number of tubular elements meeting there.

What is claimed is:

1. A marine platform, comprising: a structure including a lattice of hollow tubular elements sealingly joined to one another, a plurality of pickups individually mounted on selected ones of said tubular elements for detecting leakage of a fluid through a tubular element wall, each of said pickups comprising an autonomous, long life energy source and acoustic signal transmission means for transmitting, in the form of binary coded acoustic signals, messages relating to an address of the transmitting pickup and data detected thereby, a signal acquisition unit (10) disposed on a non-submerged part of said platform, and a submerged intermediate transmission means (11) for receiving acoustic signals transmitted from said pickups through the water and connected by cable means (12) to said signal acquisition unit, said acoustic signals being composed of two distinct frequencies defining two possible states of a binary bit.

2. A platform according to claim 1, wherein said pickups are adapted to transmit acoustic signals of frequencies between 40 and 80 KHz.

3. A platform according to claim 1, wherein said pickups are adapted to transmit successive bits at intervals such that between the end of a preceding bit and the beginning of the following bit there is a sufficient interval of time for the damping of all the waves which, because of the transmission of said preceding bit, could act on said signal acquisition unit through multi-paths or reflections.

4. A platform according to claim 1, wherein said pickups are adapted to transmit automatically an acoustic signal at predetermined intervals of time.

5. A platform according to claim 4, wherein said pickups are adapted to transmit automatically an acoustic signal at shorter intervals of time as soon as they detect the passage of a fluid through a tubular element wall.

6. A platform according to claim 1, wherein said pickups are adapted to detect a fall in pressure inside said tubular elements which are initially filled with a gas under pressure, each said pickup transmitting acoustic signals dependent on a differential pressure measuring means subjected to said gas under pressure in said tubular elements and to an internal reference pressure in an auxiliary chamber (23) disposed in said pickup and initially set at a pressure equal to that of said tubular elements.

* * * * *